United States Patent
Encinas et al.

(10) Patent No.: US 7,500,265 B2
(45) Date of Patent: Mar. 3, 2009

(54) APPARATUS AND METHOD TO IDENTIFY SPAM EMAILS

(75) Inventors: Susan Encinas, Tucson, AZ (US); Daniel J. Winarski, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 875 days.

(21) Appl. No.: 10/929,082

(22) Filed: Aug. 27, 2004

(65) Prior Publication Data

US 2006/0047760 A1    Mar. 2, 2006

(51) Int. Cl.
G06F 11/00 (2006.01)

(52) U.S. Cl. .......................... 726/22; 709/206; 726/23; 726/24; 726/25; 379/93.01

(58) Field of Classification Search ................. 709/206; 726/22, 23, 24, 25; 379/93.01
See application file for complete search history.

(56) References Cited

U.S. PATENT DOCUMENTS

| | | | | | |
|---|---|---|---|---|---|
| 5,765,028 | A | * | 6/1998 | Gladden | 706/25 |
| 5,805,911 | A | * | 9/1998 | Miller | 715/234 |
| 5,845,285 | A | * | 12/1998 | Klein | 707/101 |
| 5,999,932 | A | * | 12/1999 | Paul | 707/10 |
| 6,023,723 | A | * | 2/2000 | McCormick et al. | 709/206 |
| 6,161,130 | A | * | 12/2000 | Horvitz et al. | 709/206 |
| 6,199,102 | B1 | * | 3/2001 | Cobb | 709/206 |
| 6,654,787 | B1 | * | 11/2003 | Aronson et al. | 709/206 |
| 7,016,939 | B1 | * | 3/2006 | Rothwell et al. | 709/206 |
| 2005/0060643 | A1 | * | 3/2005 | Glass et al. | 715/501.1 |
| 2005/0131811 | A1 | * | 6/2005 | Ranzini et al. | 705/39 |
| 2005/0198160 | A1 | * | 9/2005 | Shannon et al. | 709/206 |

* cited by examiner

*Primary Examiner*—KimYen Vu
*Assistant Examiner*—April Y Shan
(74) *Attorney, Agent, or Firm*—Dale F. Regelman; Quarles & Brady LLP

(57) ABSTRACT

A method and apparatus to identity SPAM emails is disclosed. The method sets a misspelling rejection ratio. Upon receipt of an email comprising (X) words, the method determines the number (Y) of misspelled words comprising that email. The method then calculates a misspelling ratio by dividing (Y) by (X), and then determines if the misspelling ratio is greater than or equal to the misspelling rejection ratio. If the method determines that the misspelling ratio is greater than or equal to the misspelling rejection ratio, then the method reports the email as SPAM. In certain embodiments, the detection of words used to trigger the rejection of SPAM is based on a fuzzy search of alternate spellings. These alternate spellings may come from a spell checker.

8 Claims, 5 Drawing Sheets

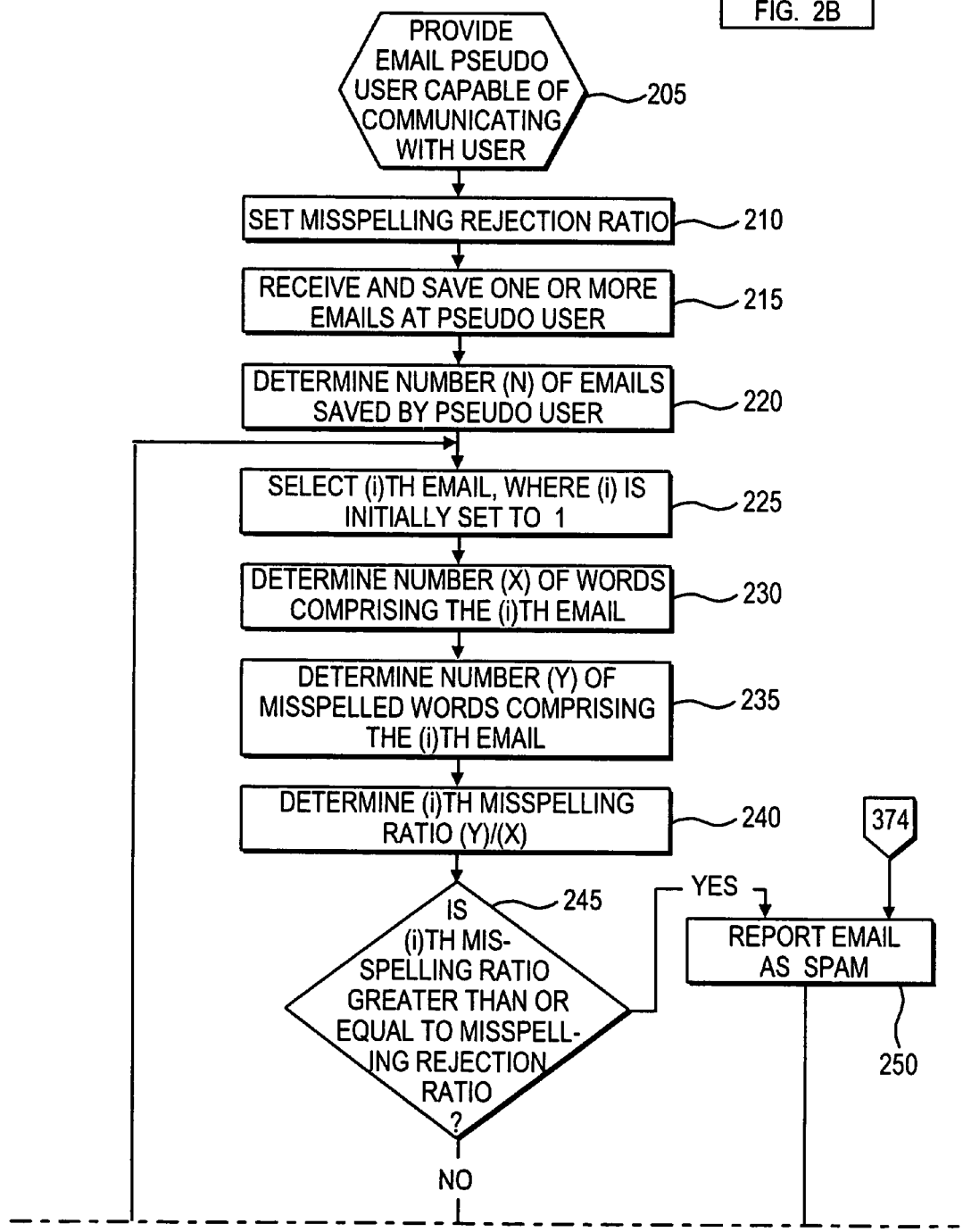

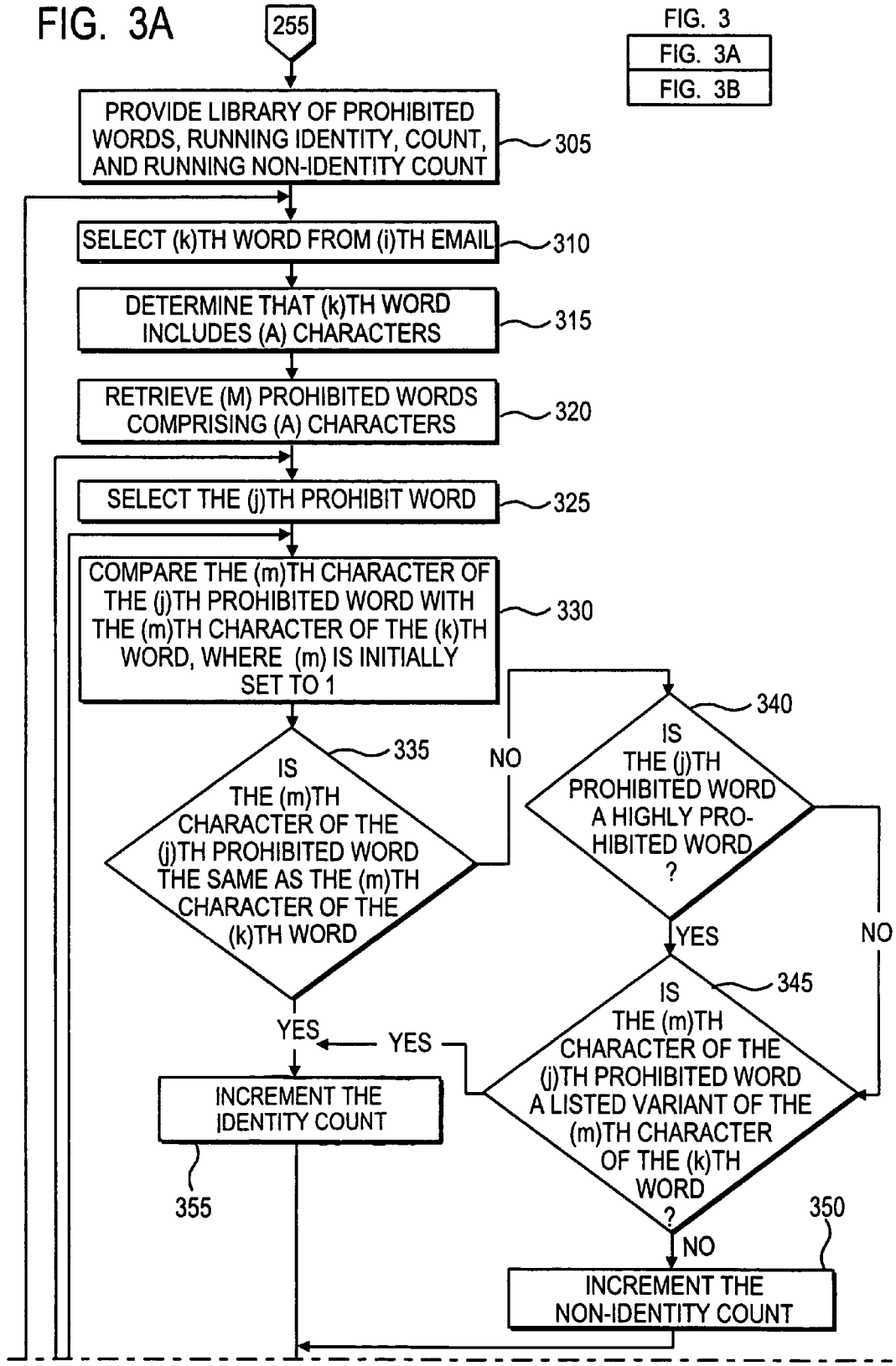

ated in a stand-alone enclosure. In alternative embodiments, Pseudo User 120 is integral with email source 110.

APPARATUS AND METHOD TO IDENTIFY SPAM EMAILS

FIELD OF THE INVENTION

This invention relates to an apparatus and method to identify SPAM emails.

BACKGROUND OF THE INVENTION

Over the past year, a sharp increase of unsolicited email, primarily of the commercial variety, has occurred. Advertisers, reputable and not-so-reputable, have discovered that they can use telemarketing techniques without spending a dime for each call. As those skilled in the art will appreciate, a "SPAM" email comprises an email which was not solicited by the email recipient. Certain SPAM emails comprise offensive material, including pornographic text and/or images.

A June, 2004 report from Nucleus Research makes certain troubling assertions, including the notion that SPAM emails cost an average of $1,934 per employee a year in lost productivity. The cost in July 2003 was estimated at $874 per employee a year.

Problems arising from SPAM are not limited to the lost productivity of employees. In a Jun. 9, 2004 report, vnunet-.com reports that a third of US households using the internet have said that as much as three quarters of their email is SPAM. According to a recent survey, the effort and expense that Internet Service Providers ("ISPs") are devoting to anti-SPAM measures are failing to stem the rising tide of unwanted email. The sources of SPAM emails, i.e. "SPAM-ERS", attempt to keep one step ahead of ISPs. One technique used by SPAMERS is to intentionally misspell certain words hoping that an ISP's email filters will not recognize those misspelled words as SPAM.

What is needed is a more effective apparatus and method to identify, and delete, SPAM emails. Applicants' apparatus and method provide an enhanced ability to identify, and then delete, SPAM emails.

SUMMARY OF THE INVENTION

Applicants' invention includes an apparatus and method to identity SPAM emails. Applicants' method sets a misspelling rejection ratio. Upon receipt of an email comprising (X) words, Applicants' method determines the number (Y) of misspelled words comprising that email. Applicants' method then calculates a misspelling ratio by dividing (Y) by (X), and then determines if the misspelling ratio is greater than or equal to the misspelling rejection ratio. If Applicants' method determines that the misspelling ratio is greater than or equal to the misspelling rejection ratio, then the method reports the email as SPAM.

Alternately, the detection of words used to trigger the rejection of SPAM is based on a fuzzy search of alternate spellings. These alternate spellings may come from a spell checker.

BRIEF DESCRIPTION OF THE DRAWINGS

The invention will be better understood from a reading of the following detailed description taken in conjunction with the drawings in which like reference designators are used to designate like elements, and in which:

FIG. 2A is a flow chart summarizing certain steps of Applicants' method to identify and delete SPAM emails;

FIG. 3A is a flow chart summarizing certain steps of Applicants' fuzzy word search algorithm.

DETAILED DESCRIPTION OF THE PREFERRED EMBODIMENTS

This invention is described in preferred embodiments in the following description with reference to the Figures, in which like numbers represent the same or similar elements. The invention will be described as embodied in an apparatus and method to identify and delete SPAM emails.

Figure 1:
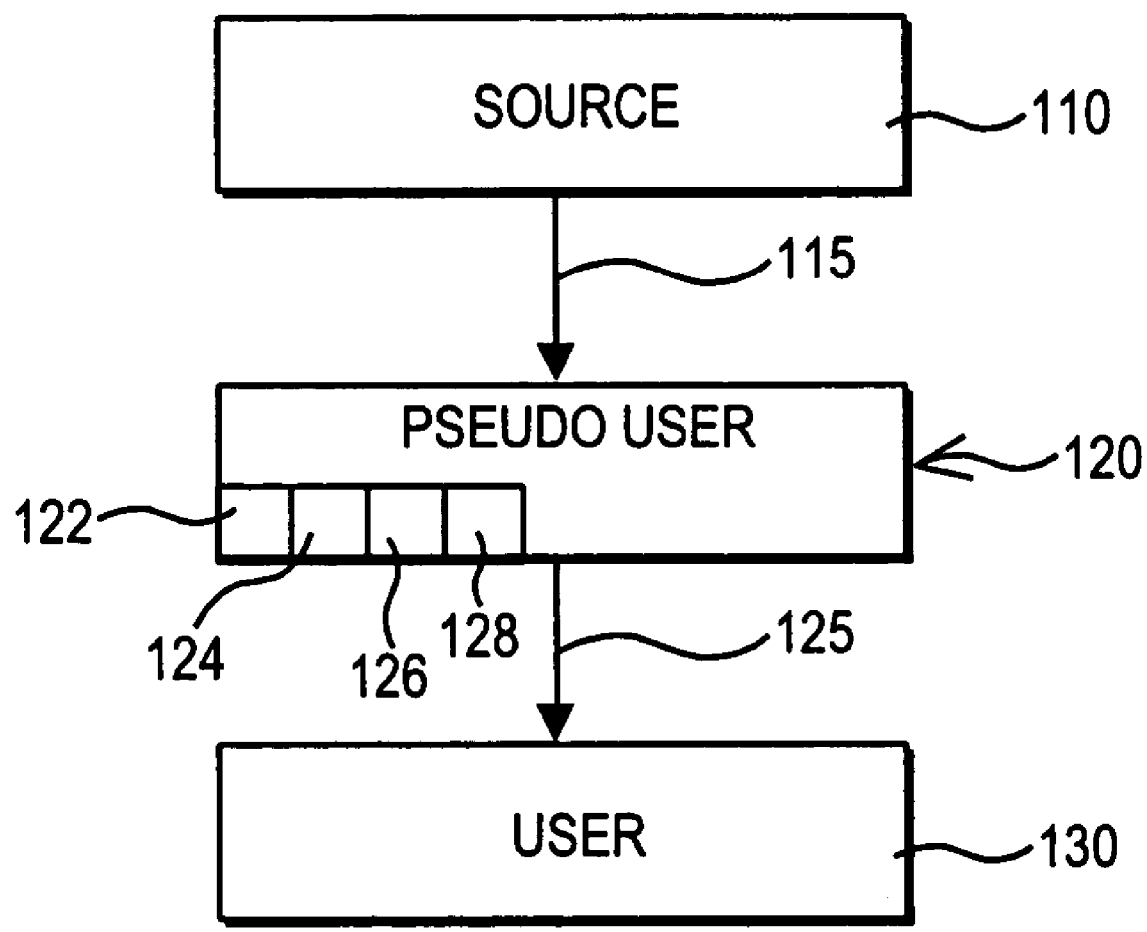
FIG. 1 is a block diagram showing Applicants' apparatus.

Referring now to FIG. 1, Applicants' apparatus comprises Pseudo User 120, wherein Pseudo User 120 is disposed between User 130 and the source of emails 110 provided to User 130. Email source 110 is capable of communicating with Pseudo User 120 via communication link 115. In certain embodiments, communication link 115 comprises a wireless communication link. In certain embodiments, communication link 115 is selected from the group comprising a serial interconnection, such as RS-232 or RS-422, an ethernet interconnection, a SCSI interconnection, an iSCSI interconnection, a Gigabit Ethernet interconnection, a Bluetooth interconnection, a Fibre Channel interconnection, an ESCON interconnection, a FICON interconnection, a Local Area Network (LAN), a private Wide Area Network (WAN), a public wide area network, Storage Area Network (SAN), Transmission Control Protocol/Internet Protocol (TCP/IP), the Internet, and combinations thereof.

In certain embodiments, source 110 comprises an internet service provider. The illustrated embodiment of FIG. 1 shows a single email source 110. In other embodiments, a plurality of email sources 110 are capable of communicating with Pseudo User 120 via a plurality of communication links, wherein each of those links are independently selected from the group comprising a wireless communication link, a serial interconnection such as RS-232 or RS-422, an ethernet interconnection, a SCSI interconnection, an iSCSI interconnection, a Gigabit Ethernet interconnection, a Bluetooth interconnection, a Fibre Channel interconnection, an ESCON interconnection, a FICON interconnection, a Local Area Network (LAN), a private Wide Area Network (WAN), a public wide area network, Storage Area Network (SAN), Transmission Control Protocol/Internet Protocol (TCP/IP), the Internet, and combinations thereof.

In certain embodiments, User 130 comprises a computing device. In certain embodiments, User 130 comprises a computer system, such as a mainframe, personal computer, workstation, and combinations thereof, including an operating system such as Windows, AIX, Unix, MVS, LINUX, etc. (Windows is a registered trademark of Microsoft Corporation; AIX is a registered trademark and MVS is a trademark of IBM Corporation; and UNIX is a registered trademark in the United States and other countries licensed exclusively through The Open Group.)

Pseudo User 120 includes a processor 122, memory 124, and microcode 126. In certain embodiments, memory 124 comprises non-volatile memory, such as for example one or more EEPROMs (Electrically Erasable Programmable Read Only Memory), one or more flash PROMs (Programmable Read Only Memory), battery backup RAM, hard disk drive, combinations thereof, and the like.

In certain embodiments, Pseudo User 120 is integral with User 130. In certain embodiments, Pseudo user 120 is disposed external to User 130, wherein Pseudo User 120 is capable of communicating with User 130 via communication link 125. In certain embodiments, communication link 125 comprises a wireless communication link, a serial interconnection such as RS-232 or RS-422, an ethernet interconnection, a SCSI interconnection, an iSCSI interconnection, a Gigabit Ethernet interconnection, a Bluetooth interconnection, a Fibre Channel interconnection, an ESCON interconnection, a FICON interconnection, a Local Area Network (LAN), a private Wide Area Network (WAN), a public wide area network, Storage Area Network (SAN), Transmission Control Protocol/Internet Protocol (TCP/IP), the Internet, and combinations thereof.

Figure 2B:
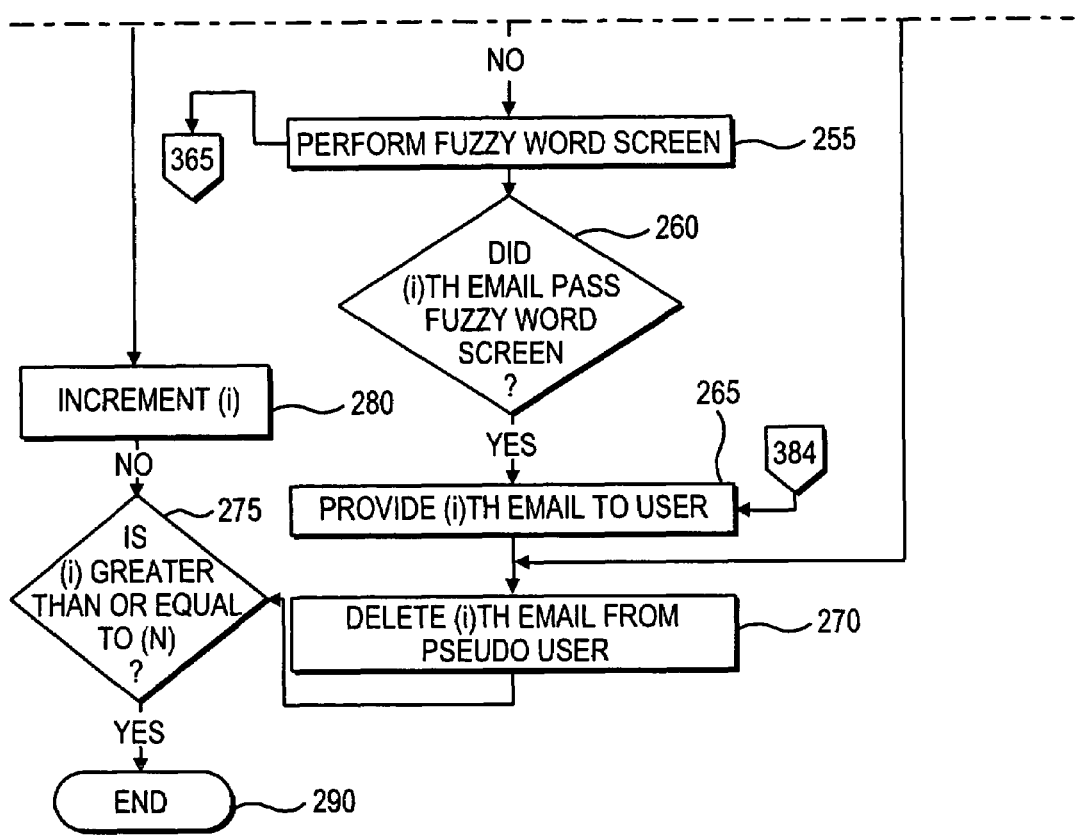
FIG. 2B is a flow chart summarizing additional steps of Applicants' method to identify and delete SPAM emails.

Applicants' invention includes a method to screen emails using Pseudo User 130. FIG. 2 summarizes certain steps of Applicants' method. Referring now to FIG. 2, in step 205 the method provides an email Pseudo User, such as Pseudo User 120, where that Pseudo User is capable of communicating with User 130.

In step 210, Applicants' method sets a misspelling rejection ratio. Step 210 may be performed at any time prior to step 245. In certain embodiments, the misspelling rejection ratio is set by the manufacturer in microcode 126 (FIG. 1) disposed in Pseudo User 120 (FIG. 1). In certain embodiments, the system user, i.e. the owner and/or operator of User 130, determines the misspelling rejection ratio of step 210. In certain embodiments, the email source, such as for example source 110, sets the misspelling rejection ratio of step 210.

In step 215, Pseudo User 120 receives one or more emails from source 110 (FIG. 1). In certain embodiments, step 215 further includes saving those one or more emails. In certain embodiments, the one or more emails of step 215 are saved in a memory device, such as for example memory 124 (FIG. 1), disposed in the receiving Pseudo User, such as for example Pseudo User 120.

In step 220, Applicants' method determines the number (N) of emails pending at the Pseudo User. In certain embodiments, step 220 is performed at random time intervals. In certain embodiments, step 220 is performed when the User instructs the resident email program to either send or receive emails. In certain embodiments, step 220 is performed at pre-determined time intervals, such as for example once every day, once every hour, once every minute, and the like. In certain embodiments, step 220 is performed by a Pseudo User apparatus, such as for example Pseudo User 120 (FIG. 1).

Applicants' method transitions from step 220 to step 225 wherein Applicants' method selects the (i)th email, wherein (i) is initially set to one, and wherein (i) is greater than or equal to 1 and less than or equal to (N). In certain embodiments, step 225 is performed by a Pseudo User apparatus, such as for example Pseudo User 120 (FIG. 1). In the event there are no pending emails, Applicants' method transitions directly through steps 225, 230, 235, 240, 245, 255, 260, 265, and 270, to step 275 wherein Applicants' method determines that (i), having a value of 1, is greater than (N), having a value of 0, and the method ends at step 290.

Applicants' method transitions from step 225 to step 230 wherein the method determines the number (X) of words comprising the (i)th email. In certain embodiments, step 230 is performed by a Pseudo User apparatus, such as for example Pseudo User 120 (FIG. 1). Applicants' method transitions from step 230 to step 235 wherein the method determines the number (Y) of misspelled words in the (i)th email. In certain embodiments, step 235 is performed by a Pseudo User apparatus, such as for example Pseudo User 120 (FIG. 1). In certain embodiments, step 235 is performed by a Pseudo User apparatus, such as for example Pseudo User 120, using any known spell checking algorithm, such as for example spell checking algorithm 128 (FIG. 1).

Applicants' method transitions from step 235 to step 240 wherein the method calculates the (i)th misspelling ratio by dividing the number of misspelled words (Y) by the total number of words (X). In certain embodiments, step 240 is performed by a Pseudo User apparatus, such as for example Pseudo User 120 (FIG. 1).

Applicants' method transitions from step 240 to step 245 wherein the method determines if the (i)th misspelling ratio is greater than the misspelling rejection ratio of step 210. In certain embodiments, step 245 is performed by a Pseudo User apparatus, such as for example Pseudo User 120 (FIG. 1). If Applicants' method determines in step 245 that the (i)th misspelling ratio is greater than or equal to the misspelling rejection ratio, then the method transitions from step 245 to step 250 and reports the (i)th email as SPAM. Applicants' method transitions from step 250 to step 270.

Alternatively, if Applicants' method determines in step 245 that the (i)th misspelling ratio is less than the misspelling rejection ratio of step 210, then in certain embodiments Applicants' method transitions from step 245 to step 255 wherein the method performs a fuzzy word screen of the (i)th email. By "fuzzy word screen," Applicants mean an algorithm that determines if the (i)th email contains words that are substantially the same as one or more pre-determined prohibited words. In certain embodiments, step 255 is implemented using the steps recited in FIG. 3.

In embodiments that include step 255, Applicants' method transitions from step 255 to step 260 wherein the method determines if the (i)th email passed the fuzzy word screen of step 255. In certain embodiments, step 260 is performed by a Pseudo User apparatus, such as for example Pseudo User 120 (FIG. 1). If Applicants' method determines in step 260 that the (i)th email did not pass the fuzzy word screen of step 255, then the method transitions from step 260 to step 250 wherein the method reports the (i)th email as SPAM. Alternatively, if Applicants' method determines in step 260 that the (i)th email did pass the fuzzy word screen of step 255, then the method transitions from step 260 to step 265 wherein the method provides the (i)th email to the User. In certain embodiments, step 260 is performed by a Pseudo User apparatus, such as for example Pseudo User 120 (FIG. 1).

In certain embodiments, if Applicants' method determines in step 245 that the (i)th misspelling ratio is less than the misspelling rejection ratio of step 210, then Applicants' method skips steps 255 and 260 and transitions from step 245 to step 265 wherein the method provides the (i)th email to the User. Applicants' method transitions from step 265 to step 270 wherein the method deletes the (i)th email from the memory disposed in the Pseudo User apparatus. In certain embodiments, step 270 is performed by a Pseudo User apparatus, such as for example Pseudo User 120 (FIG. 1).

Applicants' method transitions from step 270 to step 275 wherein the method determines if all the pending emails have been examined, i.e. if (i) is greater than or equal to (N). In certain embodiments, step 275 is performed by a Pseudo User apparatus, such as for example Pseudo User 120 (FIG. 1). If Applicants' method determines in step 275 that all the pending emails have been examined, then Applicants' method transitions from step 275 to step 290 and ends. Alternatively, if Applicants' method determines in step 275 that all the pending emails have not been examined, i.e. if (i) is less than (N), then Applicants' method transitions from step 275 to step 280 wherein the method increments (i) by 1. In certain embodiments, step 275 is performed by a Pseudo User apparatus, such as for example Pseudo User 120 (FIG. 1). Applicants' method transitions from step 280 to step 225 and continues as described above.

In certain embodiments, step 255 is implemented using the steps recited in FIG. 3. In these embodiments, if Applicants' method determines in step 245 that (i)th misspelling ratio is not greater than or equal to the misspelling rejection ratio, then Applicants' method transitions from step 245 to step 305 wherein the method provides a library of prohibited words. In certain embodiments, the library of prohibited words further includes certain words designated as highly prohibited. Step 305 further includes maintaining a running Identity Count and a running Non-Identity Count. In certain embodiments, the Identity Count is maintained by a processor, such as for example processor 122 (FIG. 1), disposed in Applicants' Pseudo User device, such as for example Pseudo User device 120 (FIG. 1). In certain embodiments, the Identity Count of step 305 is stored in memory, such as for example memory 124, disposed in Applicants' Pseudo User device. In certain embodiments, the Non-Identity Count of step 305 is stored in memory, such as for example memory 124, disposed in Applicants' Pseudo User device. In step 305, both the Identity Count and the Non-Identity Count are reset to 0. In certain embodiments, the resetting of the Identity Count and the Non-Identity Count is performed by processor 122 (FIG. 1).

Step 305 may be performed at any time prior to performing step 320. In certain embodiments, step 305 is performed by the manufacturer of the Pseudo User apparatus, and that library is disposed in the microcode or in the memory disposed in the Pseudo User apparatus. In other embodiments, the User defines the library of prohibited words, and stores that library in the memory disposed in the Pseudo User apparatus.

In step 310, Applicants' method selects the (k)th word from the (i)th email, wherein (k) is initial set to 1, and wherein (k) is greater than or equal to 1 and less than or equal to (X). In certain embodiments, step 310 is performed by a Pseudo User apparatus, such as for example Pseudo User 120 (FIG. 1). Applicants' method transitions from step 310 to step 315 wherein the method determines that the (k)th word includes (A) characters. In certain embodiments, step 315 is performed by a Pseudo User apparatus, such as for example Pseudo User 120 (FIG. 1).

Applicants' method transitions from step 315 to step 320 wherein the method searches the library of prohibited words, and abstracts (M) prohibited words, where those (M) prohibited words comprise all the prohibited words comprising (A) characters. In certain embodiments, step 320 is performed by a Pseudo User apparatus, such as for example Pseudo User 120 (FIG. 1).

Applicants' method transitions from step 320 to step 325 wherein the method selects the (j)th prohibited word, wherein (j) is initially set to 1, and wherein (j) is greater than or equal to 1 and less than or equal to (M). In certain embodiments, step 325 is performed by a Pseudo User apparatus, such as for example Pseudo User 120 (FIG. 1).

Applicants' method transitions from step 325 to step 330 wherein the method selects the (m)th character of the prohibited word selected in step 325, i.e. the (j)th prohibited word, wherein (m) is greater than or equal to 1 and less than or equal to (A). In certain embodiments, step 330 is performed by a Pseudo User apparatus, such as for example Pseudo User 120 (FIG. 1).

In step 335, Applicants' method determines if the (m)th character of the selected prohibited word is the same as the (m)th character of the (k)th word in the (i)th email. In certain embodiments, step 335 is performed by a Pseudo User apparatus, such as for example Pseudo User 120 (FIG. 1). If Applicants' method determines in step 335 that the (m)th character of the selected prohibited word is the same as the (m)th character of the (k)th word in the (i)th email, then the method transitions from step 335 to step 355 wherein the method increments the Identity Count.

Alternatively, if Applicants' method determines in step 335 that the (m)th character of the selected prohibited word is not the same as the (m)th character of the (k)th word in the (i)th email, then Applicants' method transitions from step 335 to step 340 wherein the method determines if the selected prohibited word comprises a highly prohibited word. In certain embodiments, step 340 is performed by a Pseudo User apparatus, such as for example Pseudo User 120 (FIG. 1).

If Applicants' method determines in step 340 that the selected prohibited word does not comprise a highly prohibited word, then the method transitions from step 340 to step 350 wherein the method increments the Non-Identity Count. In certain embodiments, step 350 is performed by a Pseudo User apparatus, such as for example Pseudo User 120 (FIG. 1). Applicants' method transitions from step 350 to step 360.

If Applicants' method determines in step 340 that the selected prohibited word does comprise a highly prohibited word, then the method transitions from step 340 to step 345 wherein the method determines if the (m)th character of the selected prohibited word comprises a variant of the (m)th character of the (k)th word. In certain embodiments, step 345 is performed by a Pseudo User apparatus, such as for example Pseudo User 120 (FIG. 1). In certain embodiments, step 345 includes searching a look-up table of character variants. For example, in certain embodiments, Applicants' look-up table lists the character "@" as a variant of the character "a". As another example, in certain embodiments, Applicants' look-up table lists the number zero, i.e. "0", as a variant for the letter "o".

If Applicants' method determines in step 345 that the (m)th character of the selected prohibited word does comprises a variant of the (m)th character of the (k)th word, then the method transitions from step 345 to step 355 and increments the Identity Count. In certain embodiments, step 355 is performed by a Pseudo User apparatus, such as for example Pseudo User 120 (FIG. 1). Applicants' method transitions from step 355 to step 360.

Alternatively, if Applicants' method determines in step 345 that the (m)th character of the selected prohibited word does not comprises a variant of the (m)th character of the (k)th word, then the method transitions from step 345 to step 350 wherein the method increments the Non-Identity Count. In certain embodiments, step 350 is performed by a Pseudo User apparatus, such as for example Pseudo User 120 (FIG. 1). Applicants' method transitions from step 350 to step 360.

Figure 3B:
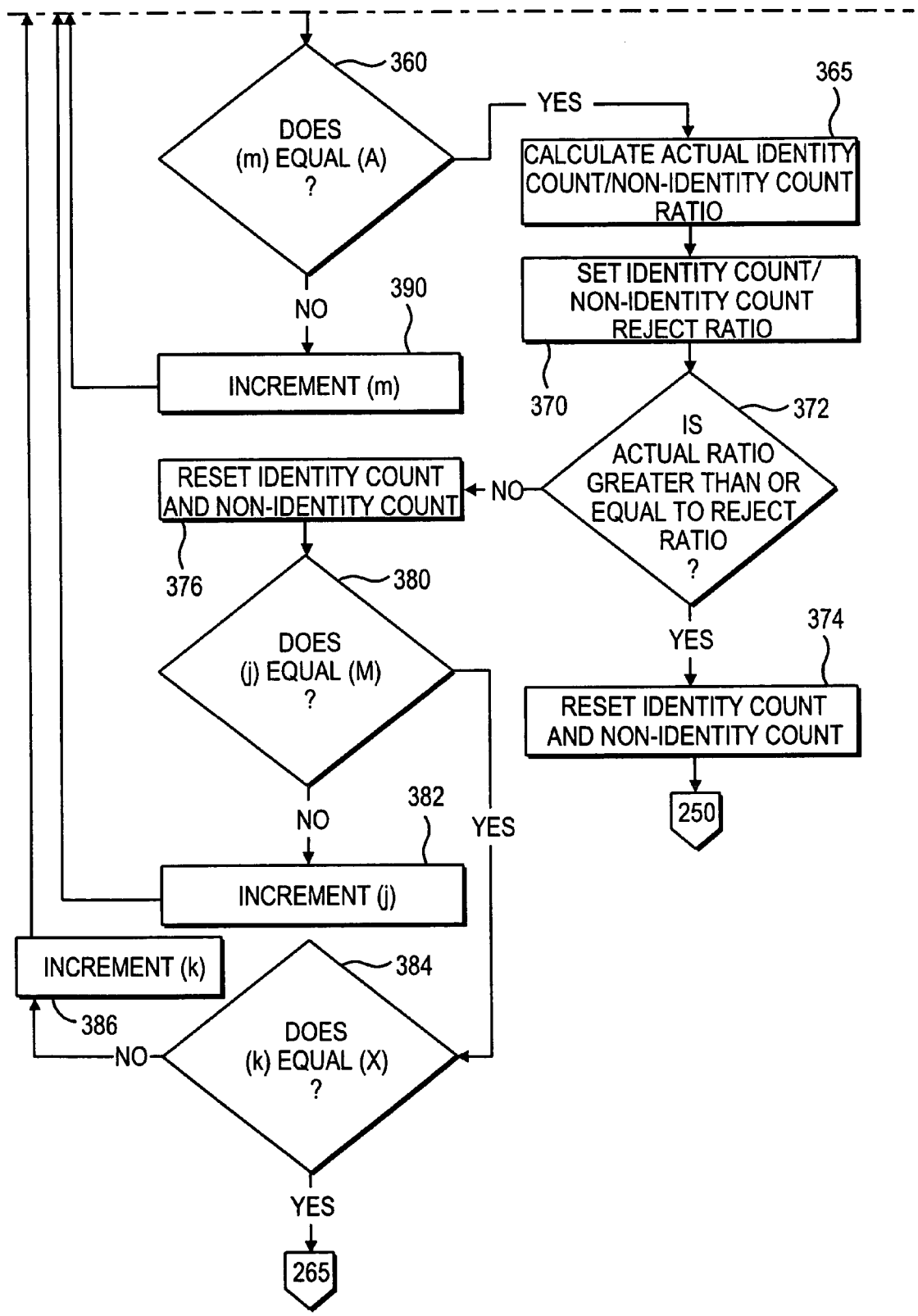
FIG. 3B is a flow chart summarizing additional steps of Applicants' fuzzy word search algorithm.

Referring now to FIG. 3B, in step 360 Applicants' method determines if all the characters of the selected email word have been examined, i.e. if (m) equals (A). In certain embodiments, step 360 is performed by a Pseudo User apparatus, such as for example Pseudo User 120 (FIG. 1). If Applicants' method determines in step 360 that (m) does not equal (A), then the method transitions from step 360 to step 390 wherein the method increments (m) by 1. In certain embodiments, step 390 is performed by a Pseudo User apparatus, such as for example Pseudo User 120 (FIG. 1). Applicants method transitions from step 390 to step 330 and continues as described above.

If Applicants' method determines in step 360 that all the characters of the selected email word have been compared to the corresponding characters of the (j)th prohibited word, then the method transitions from step 360 to step 365 wherein the method calculates an Identity Ratio by dividing the Identity Count by the Non-Identity Count. In certain embodiments, step 365 is performed by a Pseudo User apparatus, such as for example Pseudo User 120 (FIG. 1).

In step 370, Applicants' method sets a Rejection Identity Ratio. Step 370 may be performed any time prior to step 372. In certain embodiments, the Rejection Identity Ratio is set by the manufacturer in microcode 126 (FIG. 1) disposed in Pseudo User 120 (FIG. 1). In certain embodiments, the system user, i.e. the owner and/or operator of User 130, sets the Rejection Identity Ratio of step 370. In certain embodiments, the email source, such as for example source 110, sets the Rejection Identity Ratio of step 370.

In step 372, Applicants' method determines if the calculated Identity Ratio of step 365 is greater than or equal to the Rejection Identity Ratio of step 370. In certain embodiments, step 370 is performed by a Pseudo User apparatus, such as for example Pseudo User 120 (FIG. 1). If Applicants' method determines in step 372 that the calculated Identity Ratio of step 365 is greater than or equal to the Rejection Identity Ratio of step 370, then the method transitions from step 372 to step 374 wherein Applicants' method resets to zero the running Identity Count and the running Non-Identity Count. In certain embodiments, step 374 is performed by a Pseudo User apparatus, such as for example Pseudo User 120 (FIG. 1). Applicants' method transitions from step 374 to step 250 wherein the method reports the (i)th email as SPAM.

Alternatively, if the method determines in step 372 that the calculated Identity Ratio of step 365 is less than the Rejection Identity Ratio of step 370, then the method transitions from step 372 to step 376 wherein the method resets to zero the running Identity Count and the running Non-Identity Count. In certain embodiments, step 376 is performed by a Pseudo User apparatus, such as for example Pseudo User 120 (FIG. 1).

Applicants' method transitions from step 376 to step 380 wherein the method determines if the (k)th email word has been compared to each of the (M) prohibited words retrieved in step 320, i.e. if (j) equals (M). In certain embodiments, step 380 is performed by a Pseudo User apparatus, such as for example Pseudo User 120 (FIG. 1).

If Applicants' method determines in step 380 that (j) equals (M), then the method transitions from step 380 to step 384. Alternatively, if Applicants' method determines in step 380 that (j) does not equal (M), then the method transitions from step 380 to step 382 wherein the method increments (j) by 1. In certain embodiments, step 382 is performed by a Pseudo User apparatus, such as for example Pseudo User 120 (FIG. 1). Applicants' method transitions from step 382 to step 325 and continues as described herein.

In step 384, Applicants' method determines if all the words of the (i)th email have been examined, i.e. if (k) equals (X). In certain embodiments, step 384 is performed by a Pseudo User apparatus, such as for example Pseudo User 120 (FIG. 1). If Applicants' method determines in step 384 that (k) does not equal (X), then the method transitions from step 384 to step 386 wherein the method increments (k) by 1. In certain embodiments, step 386 is performed by a Pseudo User apparatus, such as for example Pseudo User 120 (FIG. 1). Applicants' method transitions from step 386 to step 310 and continues. Alternatively, if Applicants' method determines in step 384 that (k) does equal (X), then the method transitions from step 384 to step 265 wherein the method provides the (i)th email to the User.

The embodiments of Applicants' method recited in FIGS. 2, 3A, and/or 3B, may be implemented separately. Moreover, in certain embodiments, individual steps recited in FIGS. 2, 3A, and/or 3B, may be combined, eliminated, or reordered. For example, in certain embodiments the method recited in FIG. 2 does not include steps 255 and 260.

In certain embodiments, Applicants' invention includes instructions residing in memory, such as for example memory 124 (FIG. 1), where those instructions are executed by processor 122 (FIG. 1), to performs steps 215, 220, 225, 230, 235, 240, 245, 250, optionally 255, optionally 260, 265, 270, 275, and 280, recited in FIG. 2, and/or steps 310, 315, 320, 325, 330, 335, 340, 345, 350, 355, recited in FIG. 3A, and/or steps 360, 365, 370, 372, 374, 376, 380, 382, 384, 386, and 390, recited in FIG. 3B.

In other embodiments, Applicants' invention includes instructions residing in any other computer program product, where those instructions are executed by a computer external to, or internal to, Pseudo User device 120, to perform steps 215, 220, 225, 230, 235, 240, 245, 250, optionally 255, optionally 260, 265, 270, 275, and 280, recited in FIG. 2, and/or steps 310, 315, 320, 325, 330, 335, 340, 345, 350, 355, recited in FIG. 3A, and/or steps 360, 365, 370, 372, 374, 376, 380, 382, 384, 386, and 390, recited in FIG. 3B. In either case, the instructions may be encoded in an information storage medium comprising, for example, a magnetic information storage medium, an optical information storage medium, an electronic information storage medium, and the like. By "electronic storage media," Applicants mean, for example, a device such as a PROM, EPROM, EEPROM, Flash PROM, compactflash, smartmedia, and the like.

While the preferred embodiments of the present invention have been illustrated in detail, it should be apparent that modifications and adaptations to those embodiments may occur to one skilled in the art without departing from the scope of the present invention as set forth in the following claims.

We claim:

1. A method to identity SPAM emails, comprising:
   providing a pseudo user device capable of communicating with a user device;
   setting a misspelling rejection ratio;
   receiving an email comprising (X) words by said pseudo user device;
   determining a number (Y) of misspelled words comprising said email;
   calculating a misspelling ratio by dividing (Y) by (X);
   determining if said misspelling ratio is greater than or equal to said misspelling rejection ratio;
   operative if said misspelling ratio is greater than or equal to said misspelling rejection ratio, reporting said email as SPAM,
   operative if said misspelling ratio is not greater than or equal to said misspelling rejection ratio;
   providing said email by said pseudo user device to said user device;
   performing a fuzzy word screen of said email;
   wherein said performing a fuzzy word screen step comprises:
   providing a library of prohibited words, an identity count, and a non-identity count, wherein said identity count and said non-identity count are initially set to 0;
   setting a rejection identity count/non-identity count ratio;
   selecting a (k)th word from said email, wherein (k) is greater than or equal to 1 and less than or equal to (X);
   determining that the (k)th word comprises (A) characters;
   retrieving from said library (M) prohibited words comprising (A) characters;
   selecting the (j)th prohibited word, wherein (j) is greater than or equal to 1 and less than or equal to (M);

comparing, for each value of (i), the (i)th character of the (k)th email word with the (i)th character of the (j)th prohibited word, wherein (i) is greater than or equal to 1 and less than or equal to (A);

operative if the (i)th character of the (k)th email word is the same as the (i)th character of the (j)th prohibited word, incrementing said identity count;

operative if the (i)th character of the (k)th email word is not the same as the (i)th character of the (j)th prohibited word, incrementing said non-identity count;

calculating an actual identity count/non-identity count ratio;

determining if said actual identity count/non-identity count ratio is greater than or equal to said rejection identity count/non-identity count ratio;

operative if said actual identity count/non-identity count ratio is greater than or equal to said rejection identity count/non-identity count ratio, reporting said email as SPAM.

2. The method of claim 1, further comprising if said actual identity count/non-identity count ratio is greater than or equal to said rejection identity count/non-identity count ratio, resetting said identity count and said non-identity count to 0.

3. The method of claim 1, further comprising:

operative if said actual identity count/non-identity count ratio is less than said rejection identity count/non-identity count ratio:

providing said email to said user device; and resetting said identity count and said non-identity count to 0.

4. The method of claim 1, further comprising:

providing a library of prohibited words wherein one or more of those prohibited words are designated highly prohibited words;

providing a database which includes characters comprising variants of one or more letters;

operative if the (i)th character of the (k)th email word is not the same as the (i)th character of the (j)th prohibited word, determining if the (j)th prohibited word comprises a highly prohibited word;

operative if the (j)th prohibited word comprises a highly prohibited word, determining if the (i)th character of the (k)th email word is a variant of the (i)th character of the (j)th prohibited word;

operative if the (i)th character of the (k)th email word is a variant of the (i)th character of the (j)th prohibited word, incrementing said identity count;

operative if the (i)th character of the (k)th email word is not a variant of the (i)th character of the (j)th prohibited word, incrementing said non-identity count.

5. A computer program encoded in an information storage medium and usable with a programmable computer processor to identity SPAM emails, comprising:

a library of prohibited words;

computer readable program code which causes said programmable computer processor to retrieve a pre-determined misspelling rejection ratio;

computer readable program code which causes said programmable computer processor to receive an email comprising (X) words;

computer readable program code which causes said programmable computer processor to determine a number (Y) of misspelled words comprising said email;

computer readable program code which causes said programmable computer processor to calculate a misspelling ratio by dividing (Y) by (X);

computer readable program code which causes said programmable computer processor to determine if said misspelling ratio is greater than or equal to said misspelling rejection ratio;

computer readable program code which, if said misspelling ratio is greater than or equal to said misspelling rejection ratio, causes said programmable computer processor to report said email as SPAM;

computer readable program code which, if said misspelling ratio is not greater than or equal to said misspelling rejection ratio, causes said programmable computer processor to provide said email to a user device;

computer readable program code which causes said programmable computer processor to maintain an identity count, and a non-identity count, wherein said identity count and said non-identity count are initially set to 0;

computer readable program code which causes said programmable computer processor to retrieve a pre-determined rejection identity count/non-identity count ratio;

computer readable program code which causes said programmable computer processor to select the (k)th word from said email, wherein said (k)th word comprises (A) characters, and wherein (k) is greater than or equal to 1 and less than or equal to (X);

computer readable program code which causes said programmable computer processor to retrieve from said library (M) prohibited words comprising (A) characters;

computer readable program code which causes said programmable computer processor to select the (j)th prohibited word, wherein (j) is greater than or equal to 1 and less than or equal to (M);

computer readable program code which causes said programmable computer processor to compare, for each value of (i), the (i)th character of the (k)th email word with the (i)th character of the (j)th prohibited word, wherein (i) is greater than or equal to 1 and less than or equal to (A);

computer readable program code which, if the (i)th character of the (k)th email word is the same as the (i)th character of the (j)th prohibited word, causes said programmable computer processor to increment said identity count;

computer readable program code which, if the (i)th character of the (k)th email word is not the same as the (i)th character of the (j)th prohibited word, causes said programmable computer processor to increment said non-identity count;

computer readable program code which causes said programmable computer processor to calculate an actual identity count/non-identity count ratio;

computer readable program code which causes said programmable computer processor to determine if said actual identity count/non-identity count ratio is greater than or equal to said rejection identity count/non-identity count ratio;

computer readable program code which, if said actual identity count/non-identity count ratio is greater than or equal to said rejection identity count/non-identity count ratio, causes said programmable computer processor to report said email as SPAM.

6. The computer program of claim 5, further comprising computer readable program code which, if said actual identity count/non-identity count ratio is greater than or equal to said rejection identity count/non-identity count ratio, causes said programmable computer processor to reset said identity count and said non-identity count to 0.

7. The computer program of claim 5, further comprising computer readable program code which, if said actual identity count/non-identity count ratio is less than said rejection identity count/non-identity count ratio, causes said programmable computer processor to:
- providing said email to said user device; and
- resetting said identity count and said non-identity count to 0.

8. The computer program of claim 5, further comprising:
- a library of prohibited words wherein one or more of those prohibited words are designated highly prohibited words and a database which includes characters comprising variants of one or more letters;
- comprising computer readable program code which, if the (i)th character of the (k)th email word is not the same as the (i)th character of the (j)th prohibited word, causes said programmable computer processor to determine if the (j)th prohibited word comprises a highly prohibited word;
- comprising computer readable program code which, if the (j)th prohibited word comprises a highly prohibited word, causes said programmable computer processor to determine if the (i)th character of the (k)th email word is a variant of the (i)th character of the (j)th prohibited word;
- comprising computer readable program code which, if the (i)th character of the (k)th email word is a variant of the (i)th character of the (j)th prohibited word, causes said programmable computer processor to increment said identity count;
- comprising computer readable program code which, if the (i)th character of the (k)th email word is not a variant of the (i)th character of the (j)th prohibited word, causes said programmable computer processor to increment said non-identity count.

* * * * *